(12) United States Patent
Treat

(10) Patent No.: US 6,726,059 B2
(45) Date of Patent: Apr. 27, 2004

(54) QUICK RELEASE TRIGGER VALVE AND BLAST AERATOR

(75) Inventor: Rodney D. Treat, Benton, AR (US)

(73) Assignee: Global Manufacturing Inc., Little Rock, AR (US)

(*) Notice: Subject to any disclaimer, the term of this patent is extended or adjusted under 35 U.S.C. 154(b) by 0 days.

(21) Appl. No.: 10/340,115

(22) Filed: Jan. 10, 2003

(65) Prior Publication Data

US 2003/0132241 A1 Jul. 17, 2003

Related U.S. Application Data

(60) Provisional application No. 60/350,250, filed on Jan. 16, 2002.

(51) Int. Cl.$^7$ .................................................. B67D 5/00
(52) U.S. Cl. .................... 222/3; 222/195; 137/493.1; 137/493.7; 137/493.9; 138/31
(58) Field of Search .................. 222/3, 195; 137/493.1, 137/493.7, 493.9; 138/31

(56) References Cited

U.S. PATENT DOCUMENTS

| | | | |
|---|---|---|---|
| 2,273,737 A | * | 2/1942 | Snyder ..................... 137/493.9 |
| 2,716,997 A | * | 9/1955 | Crookston ............... 137/512.2 |
| 3,637,110 A | * | 1/1972 | Cirillo et al. .................. 222/3 |
| 3,651,988 A | * | 3/1972 | Cirillo ........................... 222/3 |
| 3,788,527 A | * | 1/1974 | Matson ....................... 222/195 |
| 3,861,414 A | * | 1/1975 | Peterson, II ............. 137/493.9 |
| 3,915,339 A | | 10/1975 | Matson |
| 3,942,684 A | | 3/1976 | Stetson |
| 4,051,982 A | | 10/1977 | Stetson |
| 4,197,966 A | | 4/1980 | Wadensten |
| 4,346,822 A | | 8/1982 | Wadensten |
| 4,449,644 A | | 5/1984 | Matson |
| 4,469,247 A | | 9/1984 | Tompkins |
| 4,496,076 A | | 1/1985 | Tompkins |
| 4,556,173 A | * | 12/1985 | Pausch et al. ............... 222/195 |
| 4,676,402 A | | 6/1987 | Stetson |
| 4,703,869 A | | 11/1987 | Rooy |
| 4,767,024 A | | 8/1988 | Rappen |
| 4,817,821 A | | 4/1989 | Simoens |
| 4,826,051 A | | 5/1989 | Milian |
| 4,878,513 A | * | 11/1989 | Ashby et al. ................ 137/102 |
| 4,880,147 A | | 11/1989 | Tolan |
| 5,143,256 A | | 9/1992 | Wadensten |
| 5,441,171 A | | 8/1995 | Maury |
| 5,517,898 A | | 5/1996 | Kim |
| 5,715,861 A | | 2/1998 | Williams |
| 5,762,103 A | | 6/1998 | Gregoire |
| 5,853,160 A | | 12/1998 | Hurdis |
| 5,957,464 A | | 9/1999 | Elliott |
| 6,321,939 B1 | * | 11/2001 | Treat et al. .................. 222/195 |
| 6,374,852 B1 | * | 4/2002 | Olivas ...................... 137/493.9 |

* cited by examiner

Primary Examiner—Kenneth Bomberg
(74) Attorney, Agent, or Firm—Stephen D. Carver

(57) ABSTRACT

An externally-mounted, quick-acting trigger assembly for firing blast aerators, air cannons, or the like. The trigger assembly is ideal for high temperature applications involving environmental factors such as excessive heat, humidity, and mechanical shock. The trigger comprises a symmetrical, ventilated housing that internally mounts a hollow piston. A plurality of vent orifices are radially disposed about the housing periphery, and normally covered by a resilient band forming a check valve. The trigger piston comprises a generally cylindrical base and an integral, generally conical bottom that is displaced into and out of contact with a mechanical valve seat. An air passageway through the piston is controlled by a deflectable spherical valve element that is captivated within the piston, for selectively blocking air passage through the piston by contacting an internal valve seat. This construction with internal air passageways facilitates trigger function. The base comprises a circumferential groove for seating an appropriate O-ring.

7 Claims, 21 Drawing Sheets

QUICK RELEASE TRIGGER VALVE AND BLAST AERATOR

CROSS REFERENCE TO RELATED APPLICATION

This utility patent application is based upon, and incorporates the teachings and disclosure of previously-filed and pending U.S. Provisional Patent application Ser. No. 60/350,250, which was officially filed Jan. 16, 2002, entitled Quick Release Blast Aerator Trigger Valve, and priority based upon said related prior application is hereby claimed.

BACKGROUND OF THE INVENTION

I. Field of the Invention

This invention relates generally to air-accumulator and discharge devices of the type generally known as air blasters, air cannons, or blast aerators. More particularly, the present invention relates to heavy duty blast aerators of the type classified in U.S. Patent Class 222, Subclasses 2, 3 and 195 and Class 251, Subclass 30.02.

II. Description of the Prior Art

As is well known to those with skill in the art, the passage of bulk materials through conventional handling equipment is often degraded or interrupted. Typical bulk materials comprise concrete mixtures, grains, wood chips or other granular materials disposed within large hoppers or storage bins. In conventional, conically shaped hoppers, for example, bridges or arches of bulk materials often form, preventing or minimizing the orderly flow or delivery of granular materials. Often, "rat holes" or funnels build up, and material passage is severely degraded or halted altogether. Particles of bulk material may form cohesive bonds either by adhesion due to chemical or electrostatic attraction, or particles may interlock because of horizontal and vertical compression. Such materials usually tend to cake or congeal during bulk processing. When moisture accumulates, unwanted caking tends to block flow. It is also recognized that friction between bulk material and the walls of a typical bunker or hopper in which the material is confined tends to interfere with proper flow.

Blast aerators or air cannons have long been employed to dislodge blocked or jammed bulk material. Storage bins or hoppers, for example, are often fitted with one or more high pressure air cannons that periodically blast air into the interior to dislodge caked particles, break funnels and bridges, and destroy rat holes. Bulk flow problems can temporarily be stopped by physically vibrating the hopper or container to shake loose the jammed materials. But not all materials may be dislodged in this manner. For example, large concrete bunkers may be impossible to vibrate. Materials like soft wood chips ordinarily absorb vibratory energy and must be dislodged by other methods.

Air blasters are preferred over vibrators because of efficiency. The forces outputted by blast aerators are applied directly to the material to be dislodged, rather than to the walls of the structure. Modern air blasters are also preferred over air slides, air wands, and various air screen devices which operate at low pressures. Live bottoms in hoppers or bins are limited in their effectiveness, since they may tend to create bridging or arching of material. Modern air cannons or blast aerators are intended for use as a flow stimulator against materials that are primarily moved by gravity. They are not intended to be the prime movers of such materials, and for safety purposes they should not be used to initiate the flow or movement of bulk materials unless a gravity feed is employed.

Typical blast aerators comprise a large, rigid holding tank that relatively slowly accumulate air supplied through standard, high pressure air lines available at typical industrial facilities. A special valve assembly associated with the tank includes a high volume discharge opening directed towards or within the target application. External, solenoid-activated valve assemblies are employed to periodically activates the air cannon, whereupon the large volume of air that was slowly accumulated in the holding tank is rapidly, forcibly discharged within a few milliseconds. The volume of compressed air released by a modern blast aerator strikes the bulk material at a rate over 1000 feet per second. Materials exposed to this high volume inrush are forcibly dislodged by impact. The large volume of air outputted by the aerator spreads throughout the bin or hopper, distributing forces throughout the interior that tend to homogenize and dislodge the mixture. After an exhaust blast, the actuator assembly signals the apparatus to return to a "fill" position, wherein the displaceable internal blast piston blocks the aerator blast output path. The cycle repeats as air that has relatively slowly accumulated again within the blaster is subsequently discharged during the next cycle.

U.S. Pat. No. 4,469,247, issued Sep. 4, 1984, and owned by Global Manufacturing Inc., discloses a blast aerator for dislodging bulk materials. The blast aerator tank has a blast discharge opening coaxially aligned with its longitudinal axis. The blast discharge assembly comprises a rigid, tubular discharge pipe comprising an internal shoulder that forms a valve seat. A resilient piston coaxially, slidably disposed within the pipe abuts the valve seat to seal the tank during the fill cycle. In the fill position the seal is maintained by a chamfered end of the piston that matingly, sealingly contacts a similarly chamfered seat portion of the valve seat assembly. A cavity at the piston rear is pressurized to close the valve by deflecting the piston. During periodic cycles, discharge occurs in response to cavity venting, whereupon the piston is rapidly displaced away from the valve seat, exposing the discharge pipe opening to the pressurized tank interior.

Similar blast aerators may be seen in U.S. Pat. Nos. 3,651,988; 3,915,339; 4,197,966; 4,346,822; and 5,143,256. Other relevant blast aerator technology may be seen in Great Britain Pat. Nos. 1,426,035 and 1,454,261. Also relevant are West German Patent 2,402,001 and Australian Pat. No. 175,551.

Global Manufacturing U.S. Pat. No. 4,496,076 teaches a method of employing a plurality of air cannons in a controlled array.

In some prior art aerator designs, the piston and valve assembly are disposed at a right angle relative to the discharge flow path. In addition, many blast aerators use a valve assembly that is mounted externally of the accumulator tank. The latter design features are seen in U.S. Pat. Nos. 3,942,684; 4,767,024; 4,826,051; 4,817,821; and 5,853,160.

U.S. Pat. No. 5,441,171 discloses a protrusion on the rear of a slidably captivated piston to help slow the piston after firing. This design does not bleed air off in a controlled fashion and in fact the protrusion does not shut off the flow of air out of the valve body.

U.S. Pat. No. 5,517,898 discloses a pneumatic cylinder in which coaxially disposed "pistons" include dampening sleeves. In other words, ports are interconnected with internal passageways including stein portions of the cylinder to dampen piston movement by compressed air.

During the hundreds of thousands of repetitive discharge cycles occurring over the normal life of a typical blast aerator, critical moving parts will inevitably wear and deform. Typical aerator actuating pistons encounter extremely high stresses from heat, friction, and pressure that eventually result in component failure. As the aerator piston deforms or wears, its ability to properly seal during the critical "fill cycle" is impaired. In many prior art designs that portion of the piston utilized to create a seal also functions as the working surface upon which tank pressure acts to force the piston to its rearward "blast" position, further aggravating component stress and shortening valve life. In operation, the blast piston must rapidly travel away from the seal during the discharge cycle. As it deforms over hundreds of thousands of blast cycles however, it may lose its symmetry, and misalignment within the valve tube can slow piston travel, enlarging the blast time period and denigrating the force of the discharge.

Of course, problems with wear and tear also afflict the exhaust valve or actuator assembly that triggers the blast aerator. A variety of solutions have been proposed in the prior art for controlling blast aerator assemblies. All of the aforementioned patents disclose some means for firing the aerators. Various venting means including electrical solenoids have been provided previously. All of these are intended to periodically vent critical, internal volumes of aerators, ultimately causing a blast discharge. Many of the actuator devices cyclically facilitate subsequent tank filling after a blast. When typical blast aerators are fired, the large blast piston is partially deflected by actuator ventilation, retreating from a sealed, blocking position to open and expose the discharge passageways for a blast. In use, the actuator solenoid assemblies are subject to repetitive, stressful firings, in conditions involving heat, humidity, and constant vibrations.

SUMMARY OF THE INVENTION

The invention comprises an accessory trigger or actuator assembly for detonating blast aerators, and a blast aerator equipped with the improved system. A preferred embodiment is ideal for high temperature applications involving environmental factors such as excessive, heat, humidity, and mechanical shock. The trigger comprises a unique symmetrical and ventilated housing that mounts a miniature internal piston. The trigger piston comprises a generally cylindrical, base and an integral, generally conical head. The base comprises a circumferential groove for seating an appropriate O-ring.

A rigid, ventilated housing internally mounts a hollow, reciprocating piston. A plurality of vent orifices radially disposed about the housing periphery are normally covered by a resilient band. The band may be deflected away from the orifices in response to sufficient air pressure, thus functioning as a check valve. The captivated, generally cylindrical piston is lightweight and hollow. It's integral, generally conical bottom is displaced into and out of contact with a mechanical valve seat within a cylinder formed internally of the housing. An air passageway through the piston is controlled by a deflectable ball forming a valve element that is captivated within a tapered chamber inside the piston. The ball valve selectively blocks various air passages through the piston by contacting an internal valve seat. This construction with internal air passageways facilitates trigger function. The base comprises a circumferential groove for seating an appropriate O-ring.

Thus a major object is to provide a lightweight, high speed trigger mechanism for activating blast aerators, air cannons and the like.

Of course a related object is to provide a blast aerator equipped with such a trigger.

A basic object is to provide a highly reliable trigger device for blast aerators or air cannon that resists high temperatures and other stresses encountered in use.

Another object is to provide a blast aerator trigger of the character described that is of minimal volume and weight.

A fundamental option is to provide a highly reliable trigger assembly for blast aerators.

A related object is to speed up control venting systems for blast aerators.

Another general object of this invention is to provide an aerator trigger assembly whose internal piston is configured for a multiplicity of tasks.

A still further basic object is to provide a blast aerator trigger of the character described that minimizes the frequency of service calls required in the field.

A further object is to provide an improved trigger that can be retrofitted to existing blast aerators and air cannons.

These and other objects and advantages of this invention, long with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
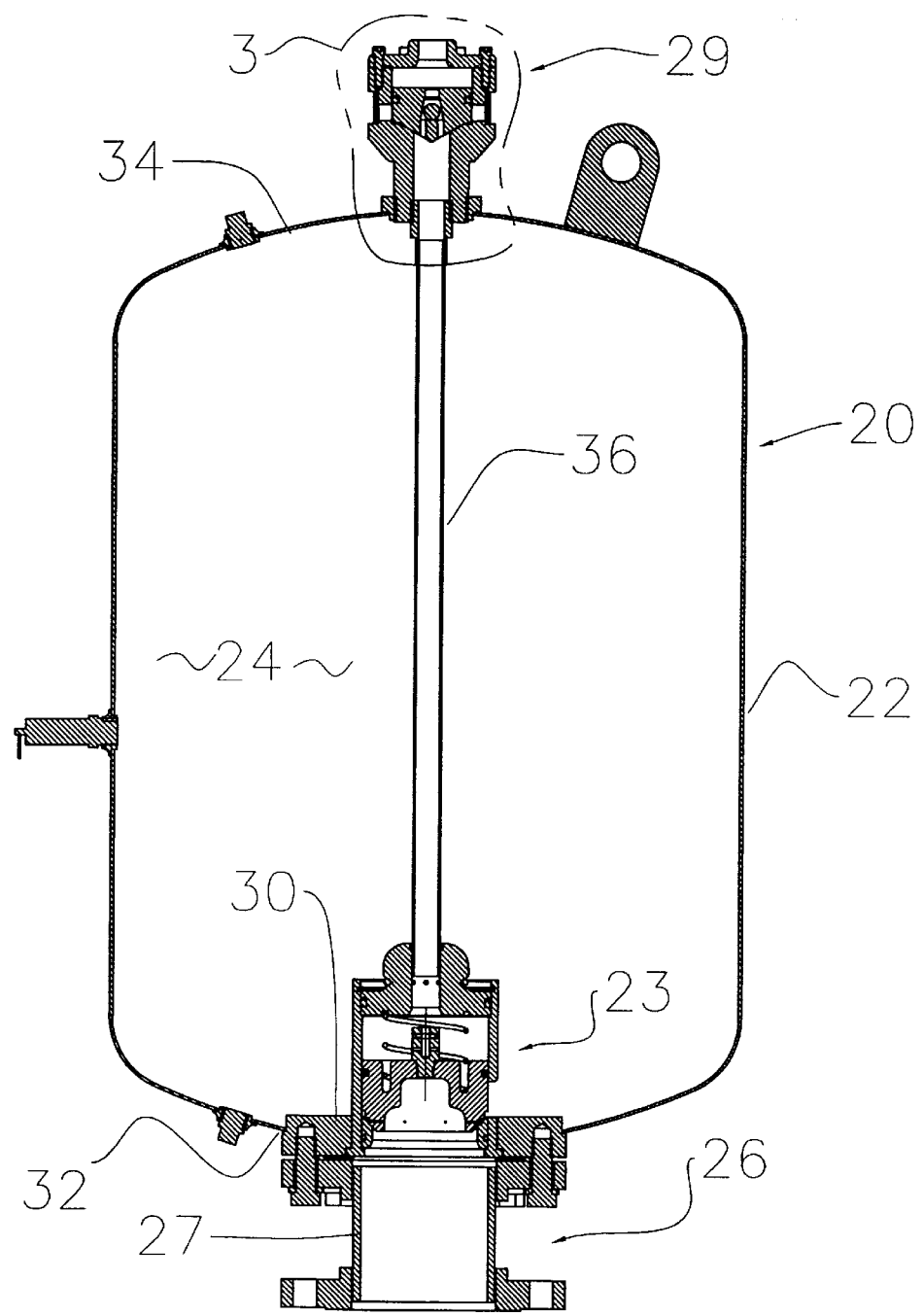
FIG. 1 is a fragmentary, sectional view of a blast aerator equipped with my new, externally mounted quick release trigger valve, with portions thereof shown in section or broken away for clarity.
Figure 2:
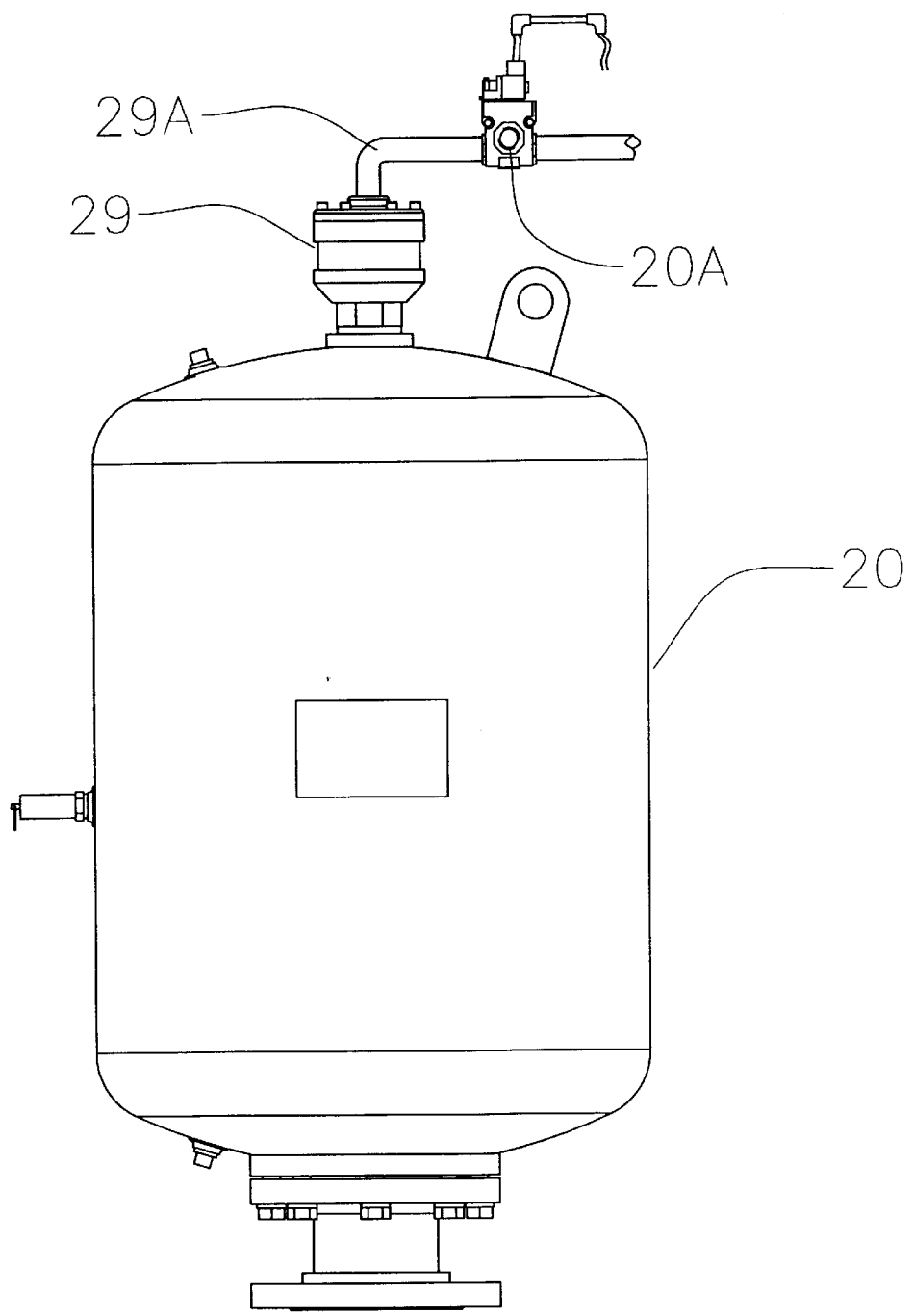
FIG. 2 is a fragmentary, isometric view of a blast aerator equipped with my new, externally mounted quick release trigger valve.

With initial reference now directed to FIGS. 1 and 2 of the appended drawings, a blast aerator constructed in accordance with the teachings of this invention is designated generally by the reference numeral 20. U.S. Pat. No. 6,321,939 issued Nov. 27, 2001 and entitled High Stress Blast Aerator with Dampened Piston, which is owned by Global Manufacturing Inc., the owner of this application, is hereby incorporated by reference for purposes of disclosure.

Figure 3:
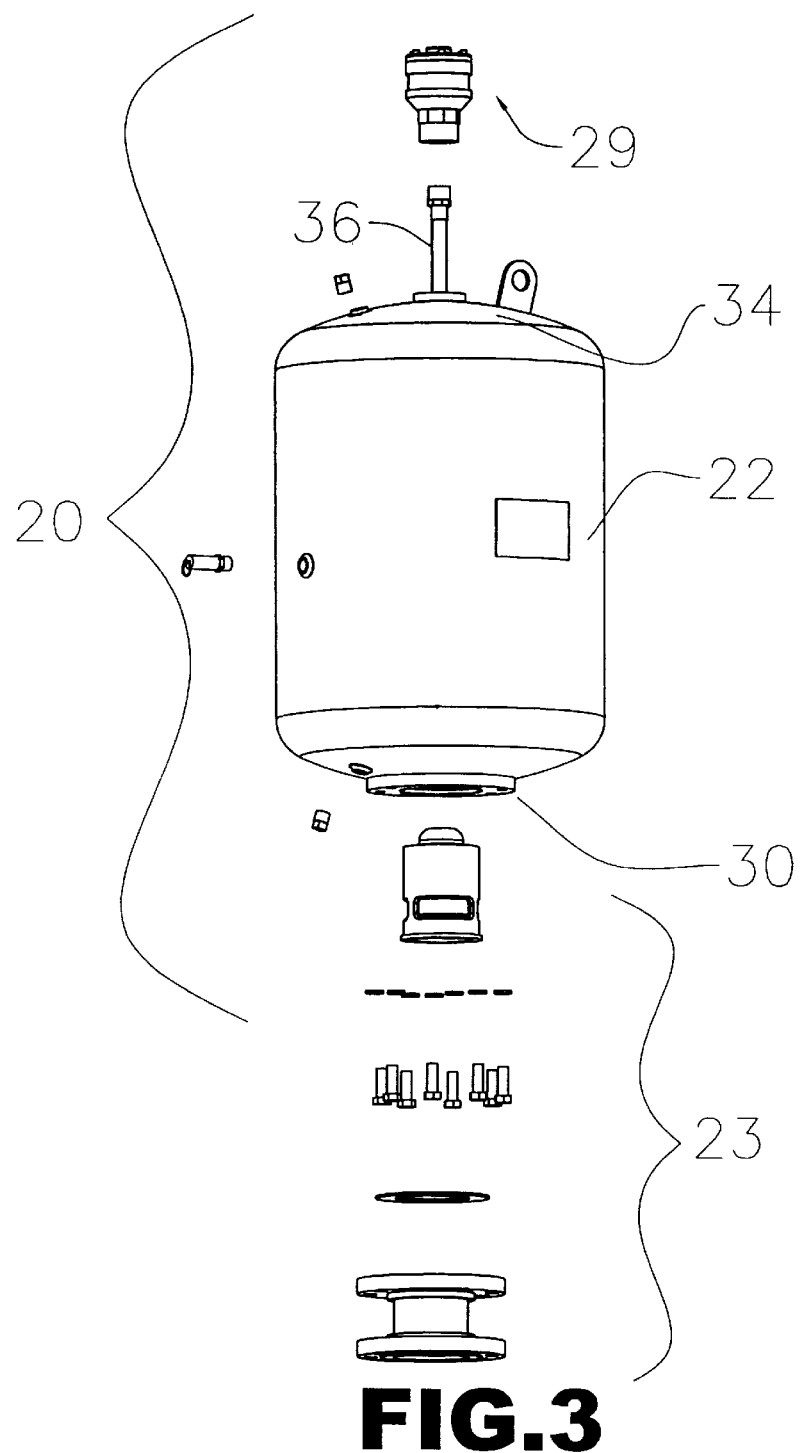
FIG. 3 is an exploded isometric view of the blast aerator and trigger valve of FIGS. 1 and 2.

Referring initially to FIGS. 1–3, blast aerator 20 comprises a rigid, barrel-like tank 22 of conventional construction that is mounted adjacent or upon a storage bin, hopper or the like. The blast output valve assembly described in U.S. Pat. No. 6,321,939 has been generally designated with the reference numeral 23. It periodically exhausts compressed air accumulated within the interior 24 (FIG. 1) of the blast aerator tank 22. Blasts of air are discharged through a standard, twin flange coupling 26 and pipe 27 that extends to the selected bulk material application (i.e., hopper, bin, bulk material storage tank etc.). The valve assembly 23 is coaxially secured within the aerator interior 24 by a rigid, front mounting flange 30 coaxially disposed at the output end 32 of tank 22, which can be dimensioned in various sizes and shapes.

My quick exhaust trigger valve assembly 29 is disposed upon tank 22 at the rear or filling end 34 of the tank. Although trigger assembly 29 can be employed with a variety of preexisting blast aerators, in this instance it is coupled in communication with an internal fill tube 36 (FIGS. 1, 3) that leads to valve assembly 23 through tank interior 24. A conventional source of external, high pressure air is delivered to trigger assembly 29 via pipe 29A (FIG. 1) in the usual manner, via optional series valve 20A. A remote electric solenoid valve (not shown) of conventional construction connected to valve 20A controls the input air flow. Trigger assembly 29 thus allows the blat aerator tank 22 to periodically fill with air, and additionally, it periodically triggers a bast discharge in the manner to be described hereinafter.

Figure 4:
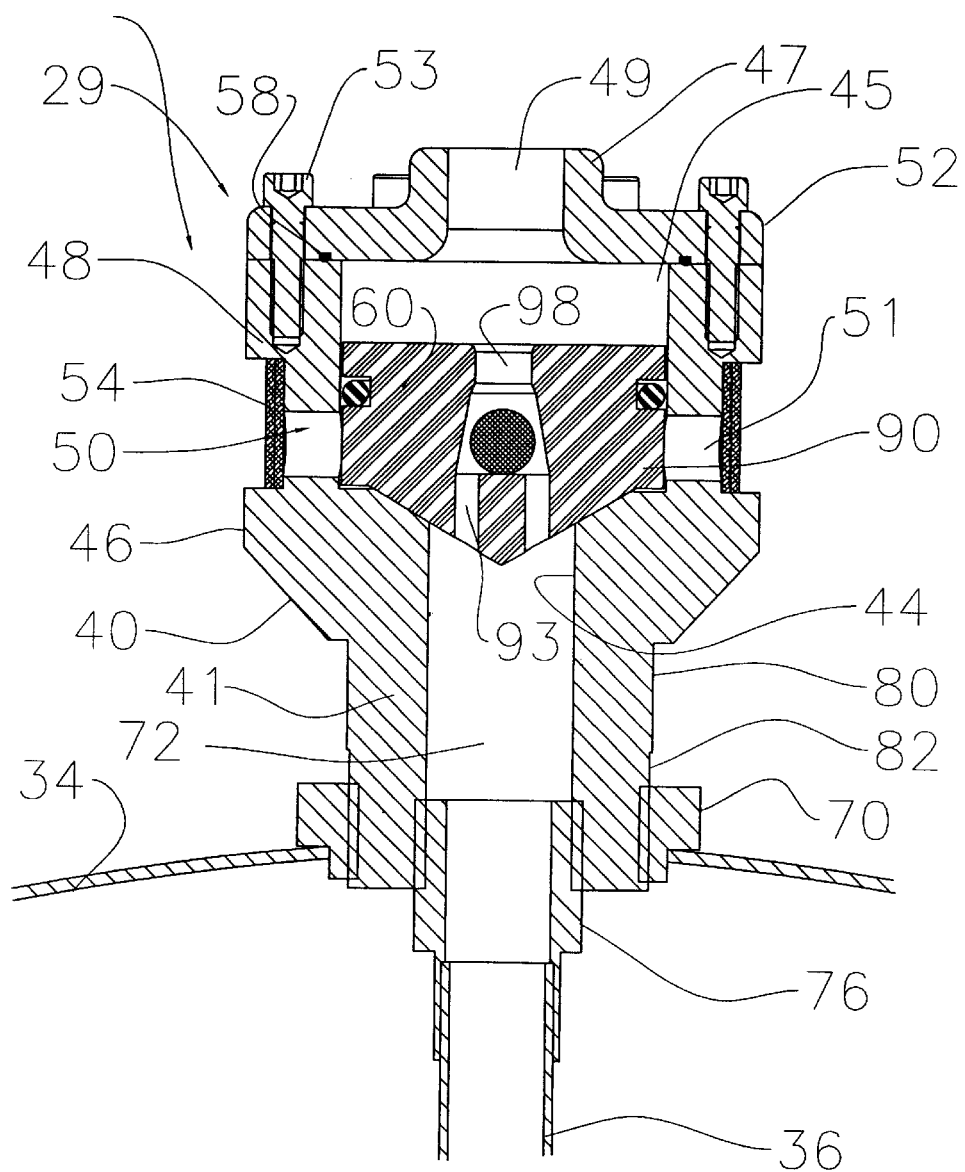
FIG. 4 is an enlarged, fragmentary, sectional view of the trigger valve and a portion of the aerator, corresponding generally to circled region 4 in FIG. 1.
Figure 5:
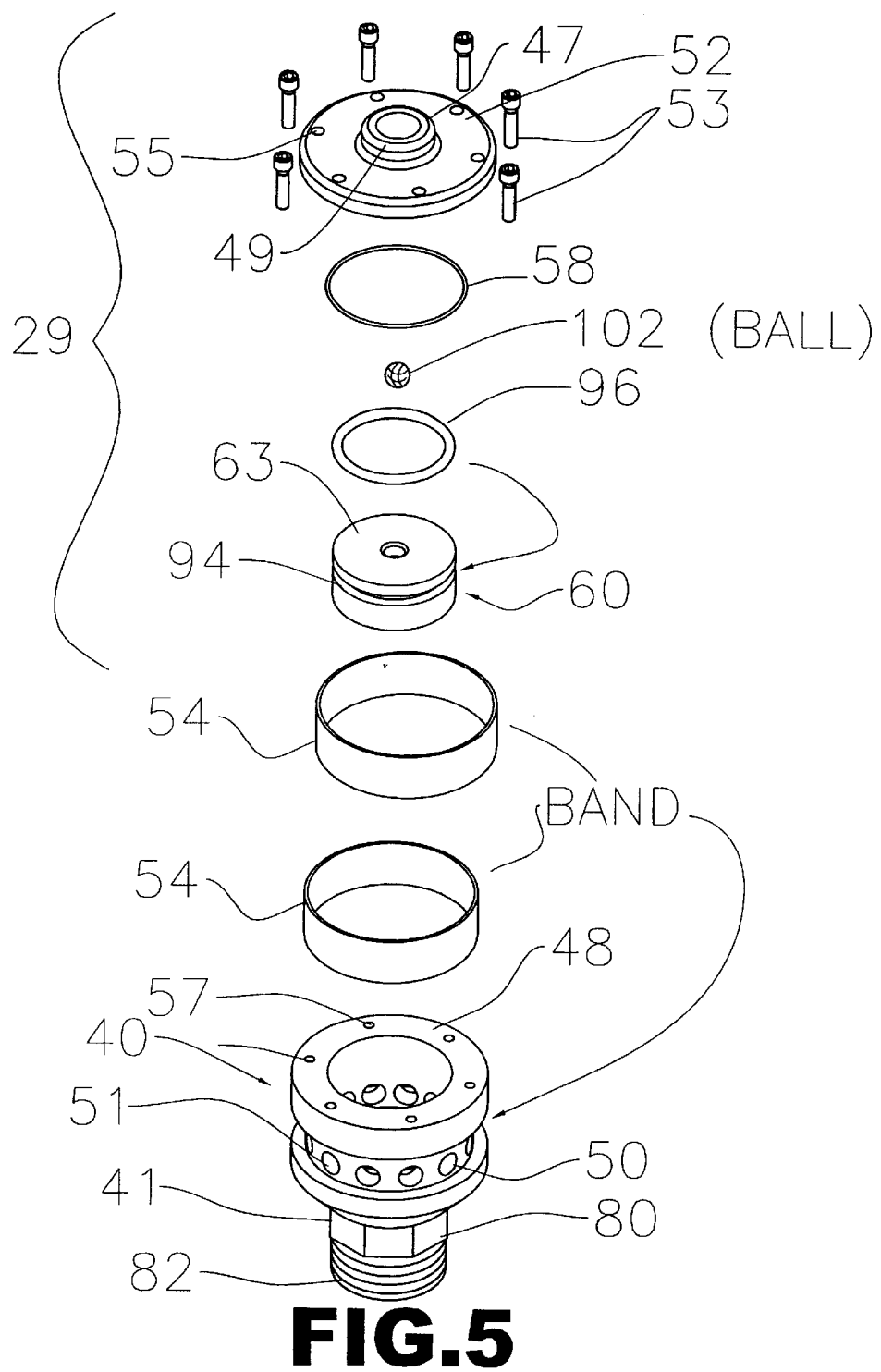
FIG. 5 is an exploded isometric view of the preferred trigger valve.
Figure 6:
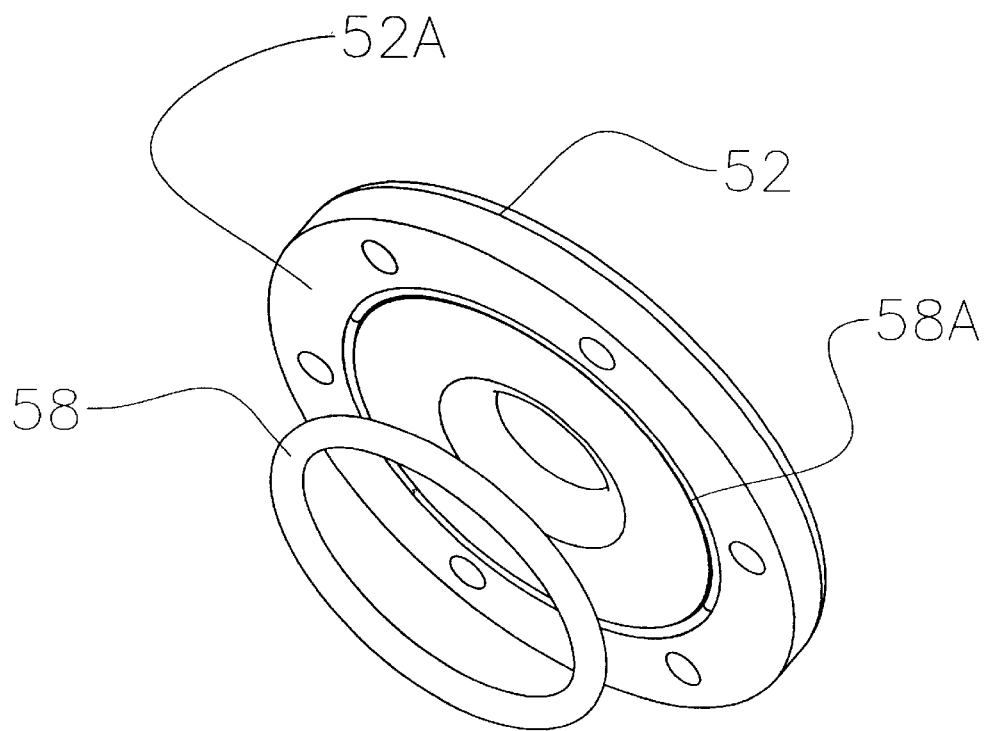
FIG. 6 is an enlarged, exploded bottom isometric view of the valve cap.

With primary reference directed to FIGS. 4–6, the new trigger assembly 29 comprises a machined, dual diameter steel housing 40 of generally cylindrical proportions. Housing shank portion 80 (FIG. 12) extends downwardly to threaded portion 82 which screws into the aerator tank upon assembly. A tapered, reduced diameter housing discharge end 41 at the bottom of the housing has a central discharge passageway 44 (FIG. 3) in fluid flow communication with internal volume 45.

Housing 40 comprises a solid, integral body 46 spaced apart from a preferably circular flange portion 48, with a reduced diameter central portion 50 (FIG. 4) defined therebetween. Portion 50 comprises a plurality of radially spaced apart orifices 51 that are normally blocked by a resilient, preferably rubber, circumscribing band 54. This deflectable circumscribing band forms a one-way check valve; it can be deflected outwardly (i.e. in a displacement direction perpendicular to the longitudinal axis of the apparatus) to vent air, but it cannot allow air to enter the interior of the apparatus. Orifices 51 are actually in the form of horizontal passageways oriented perpendicular to the longitudinal axis of the housing. The housing rear end comprises a circular flange 48 that receives an annular cap 52. Preferably, cap 52 is secured to the flange 48 by a plurality of fasteners 53 that penetrate cap orifices 55 (FIG. 6). These fasteners 53 are threadably received by and registered within aligned, radially spaced apart threaded orifices 57 (FIG. 5) in flange portion 48. An integral hub 47 coaxially aligned at the center of plate 52 defines a passageway 49, which is connected to a controlling electric solenoid of conventional construction (not shown) via pipe 29A (FIG. 1) described previously. A captivated O-ring 58 (FIGS. 5, 6) seals the junction between cap 52 and flange 48.

The trigger assembly is preferably screwed unto the aerator tank 22 as in FIG. 3. Tank end 34 (i.e., FIG. 3) has a large, circular, threaded flange 70 (FIG. 4) welded to it. Flange 70 threadably receives the lower threaded portion of body 40 whose passageway 72 communicates with threadably-coupled nipple 76. Fill pipe 36 previously described mates with nipple 76. The aligned pipes and bushings provide a fluid flow passageway generally designated by the reference numeral 65 (FIG. 3) that connects the tank interior 24 (FIG. 1) with the trigger assembly interior 45 (FIG. 3).

Figure 7:
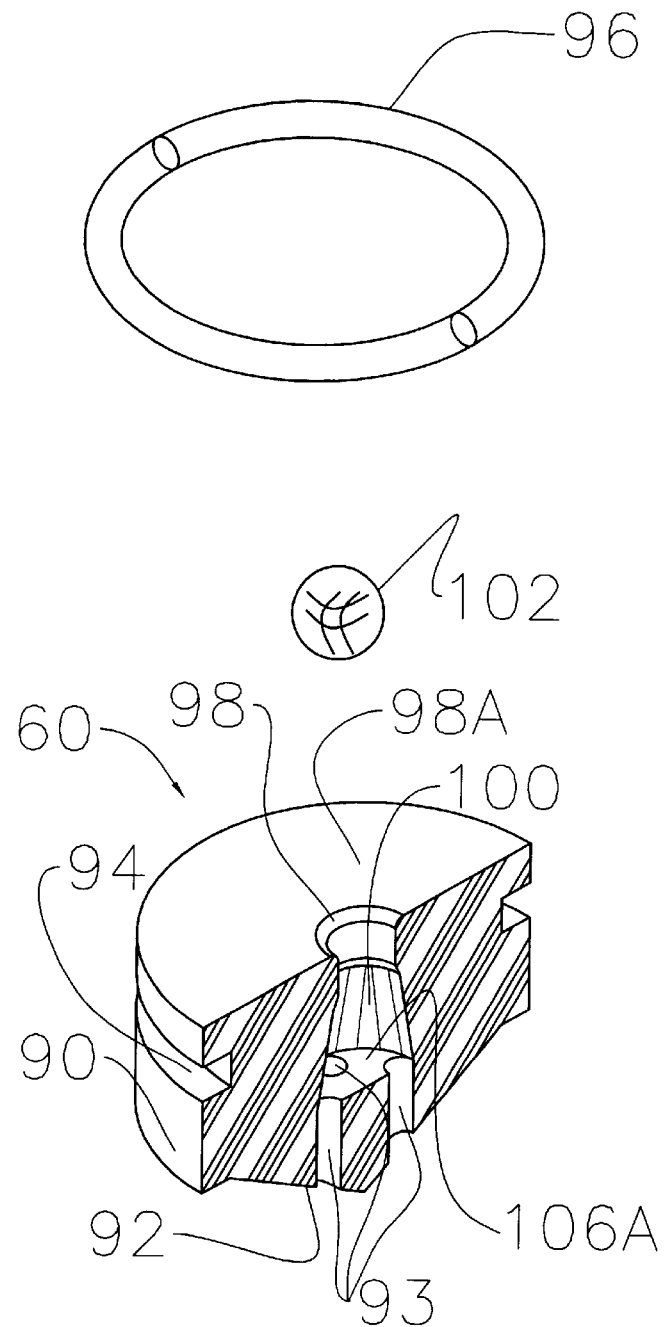
FIG. 7 is an enlarged, exploded isometric view of the preferred piston, with portions shown in section for clarity.
Figure 8:
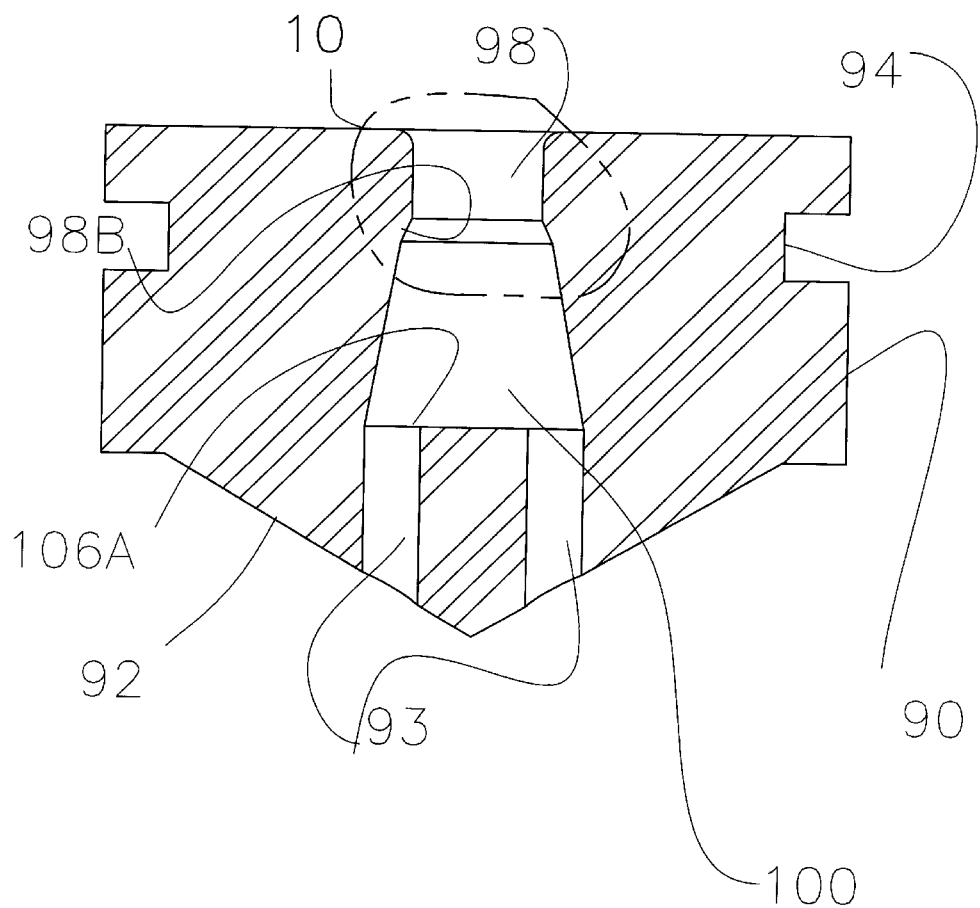
FIG. 8 is an enlarged, fragmentary sectional view of the preferred piston.
Figure 9:
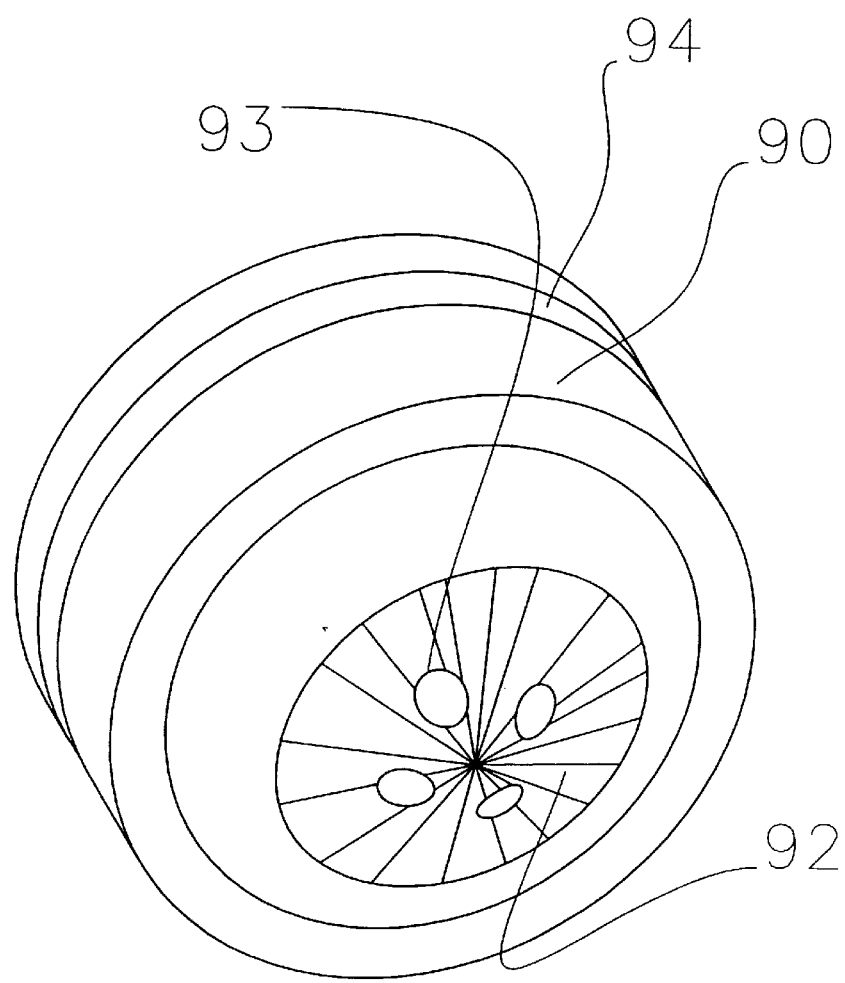
FIG. 9 is an enlarged, bottom isometric view the preferred piston.
Figure 10:
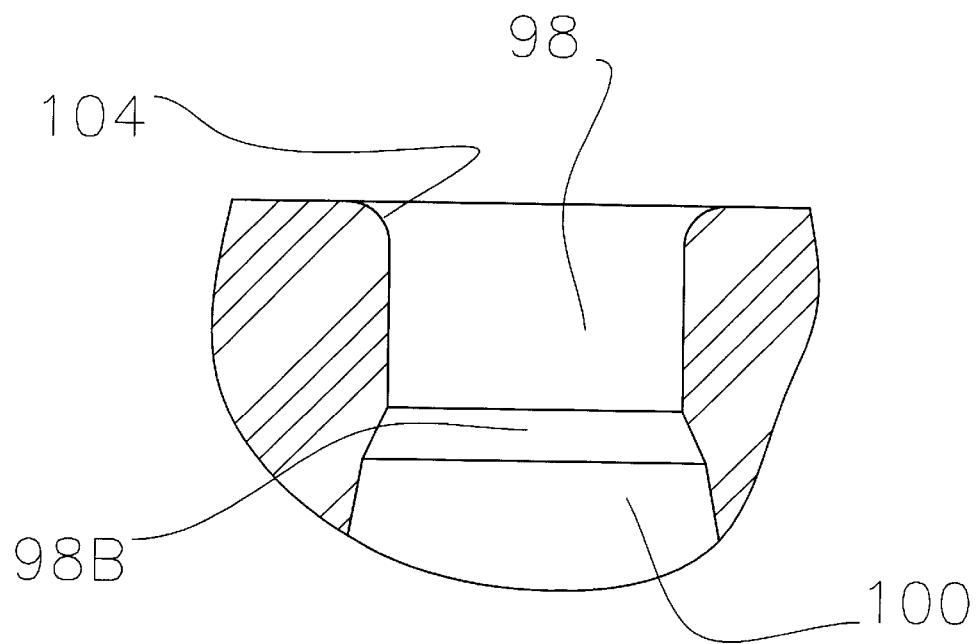
FIG. 10 an enlarged, fragmentary sectional view of circled region 10 seen in FIG. 8.
Figure 11:
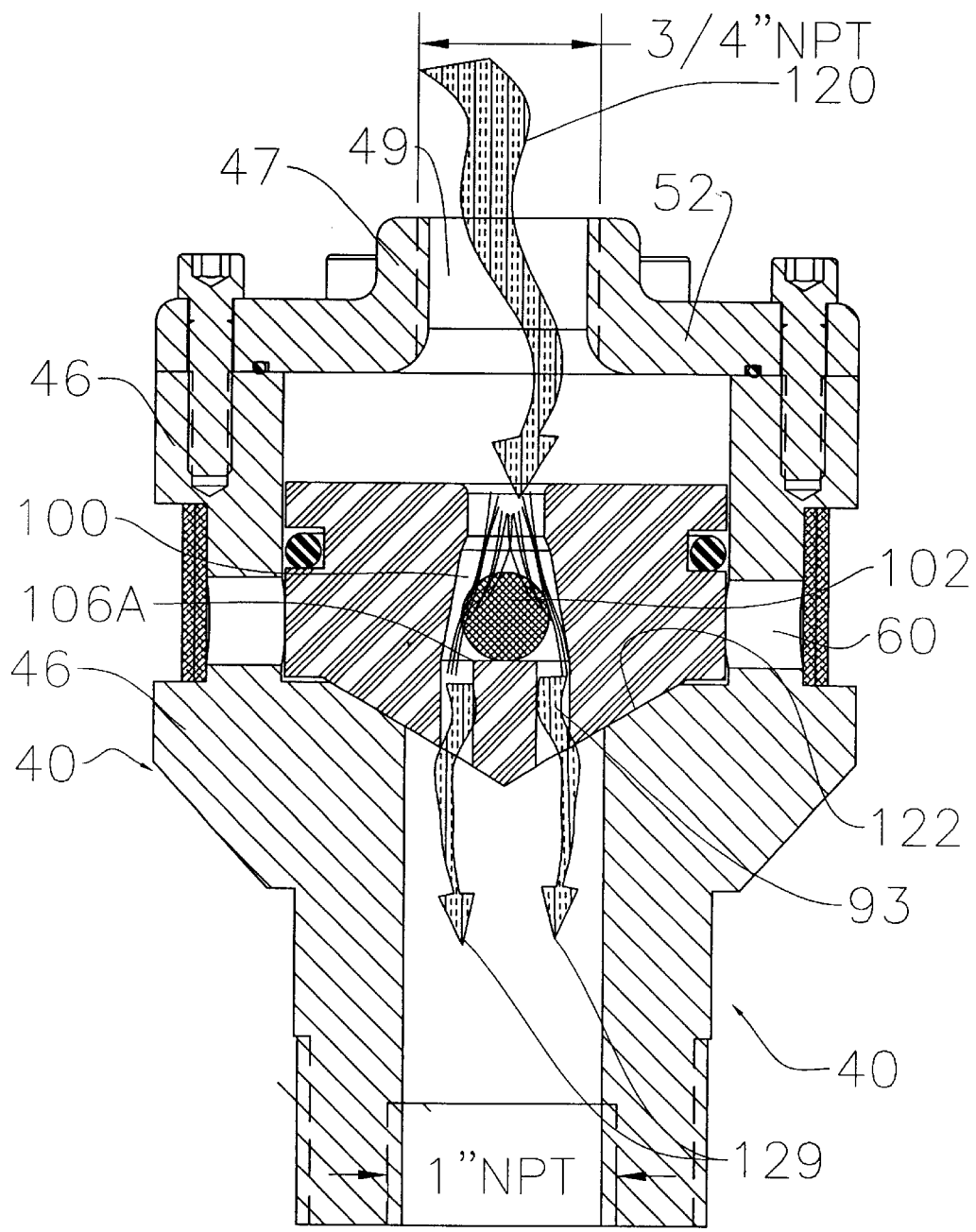
FIG. 11 is an enlarged, sectional and diagrammatic view of the trigger piston and check-valve ball disposed in the aerator filling position.
Figure 12:
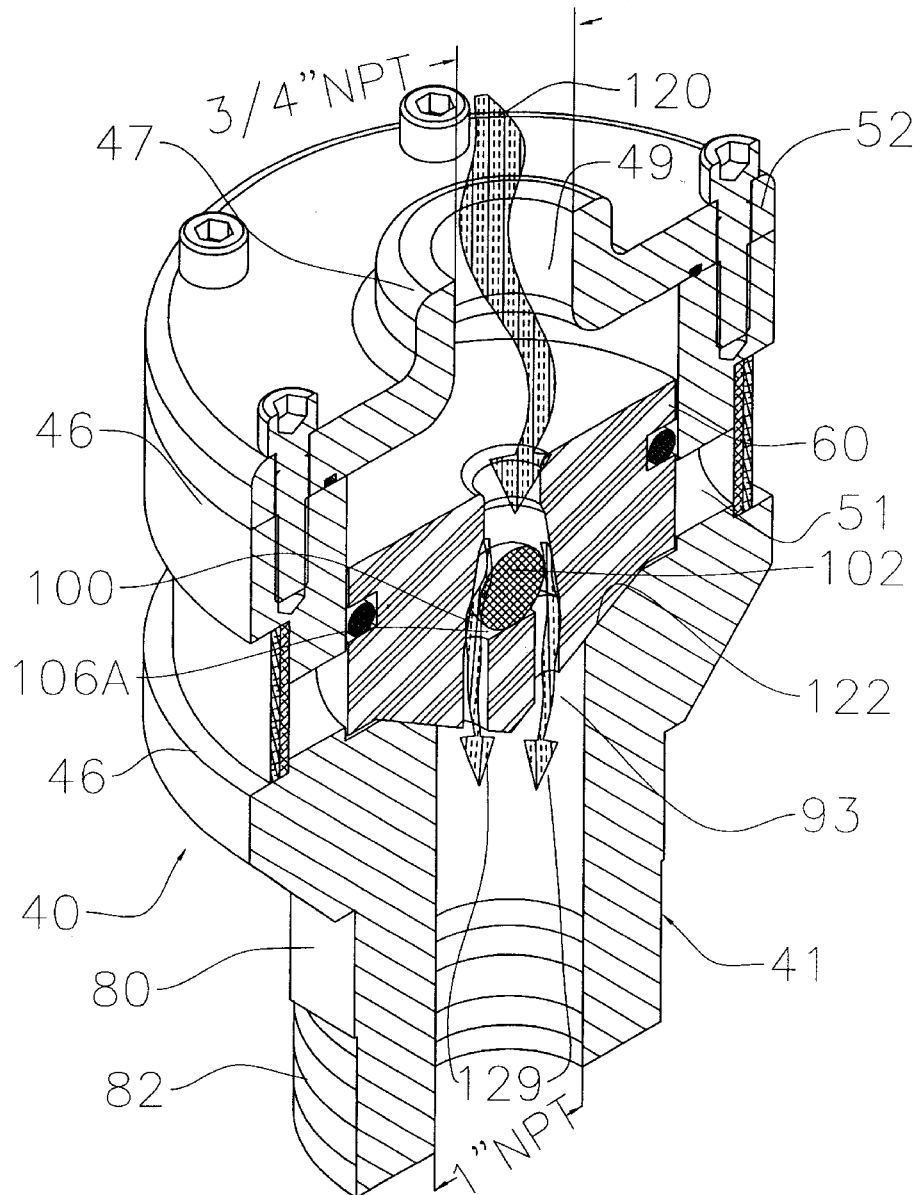
FIG. 12 is an enlarged, isometric and diagrammatic view of the trigger piston and check-valve ball disposed in the aerator filling position, with portions shown in section for clarity.
Figure 13:
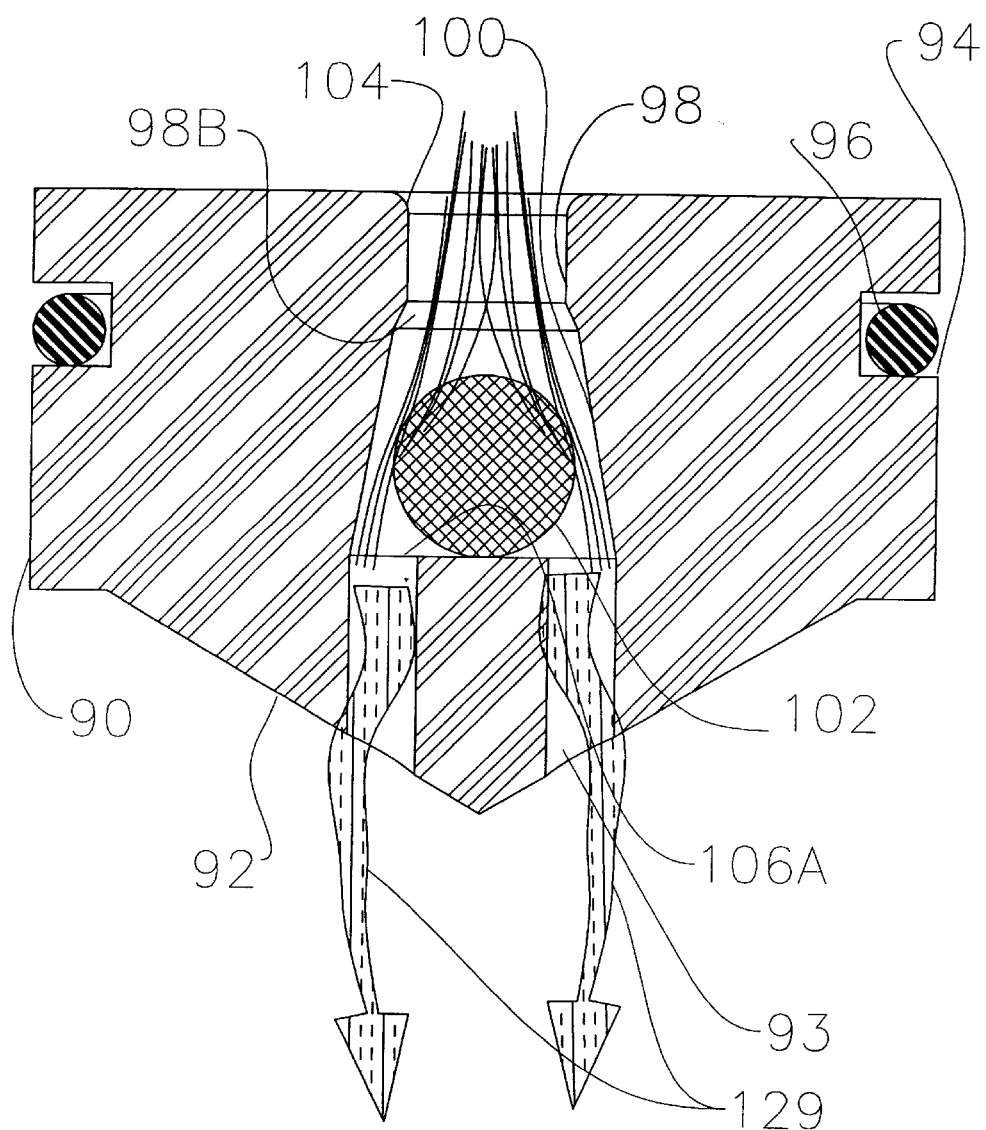
FIG. 13 is an enlarged, sectional diagrammatic view of the valve with the trigger in the aerator-fill position.
Figure 16:
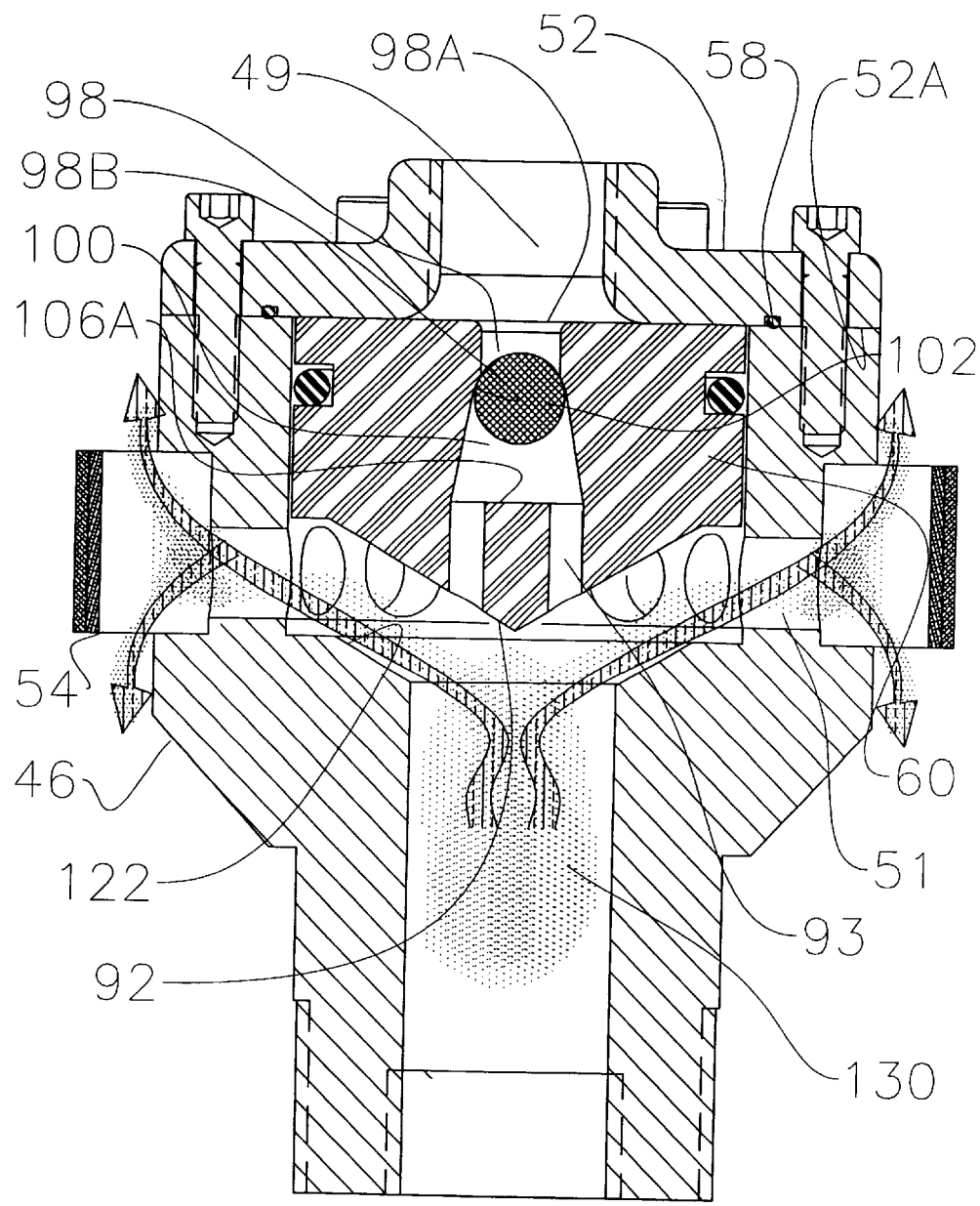
FIG. 16 is an enlarged, fragmentary, sectional view, with the trigger in the aerator-discharge position, showing air discharge paths diagrammatically.
Figure 17:
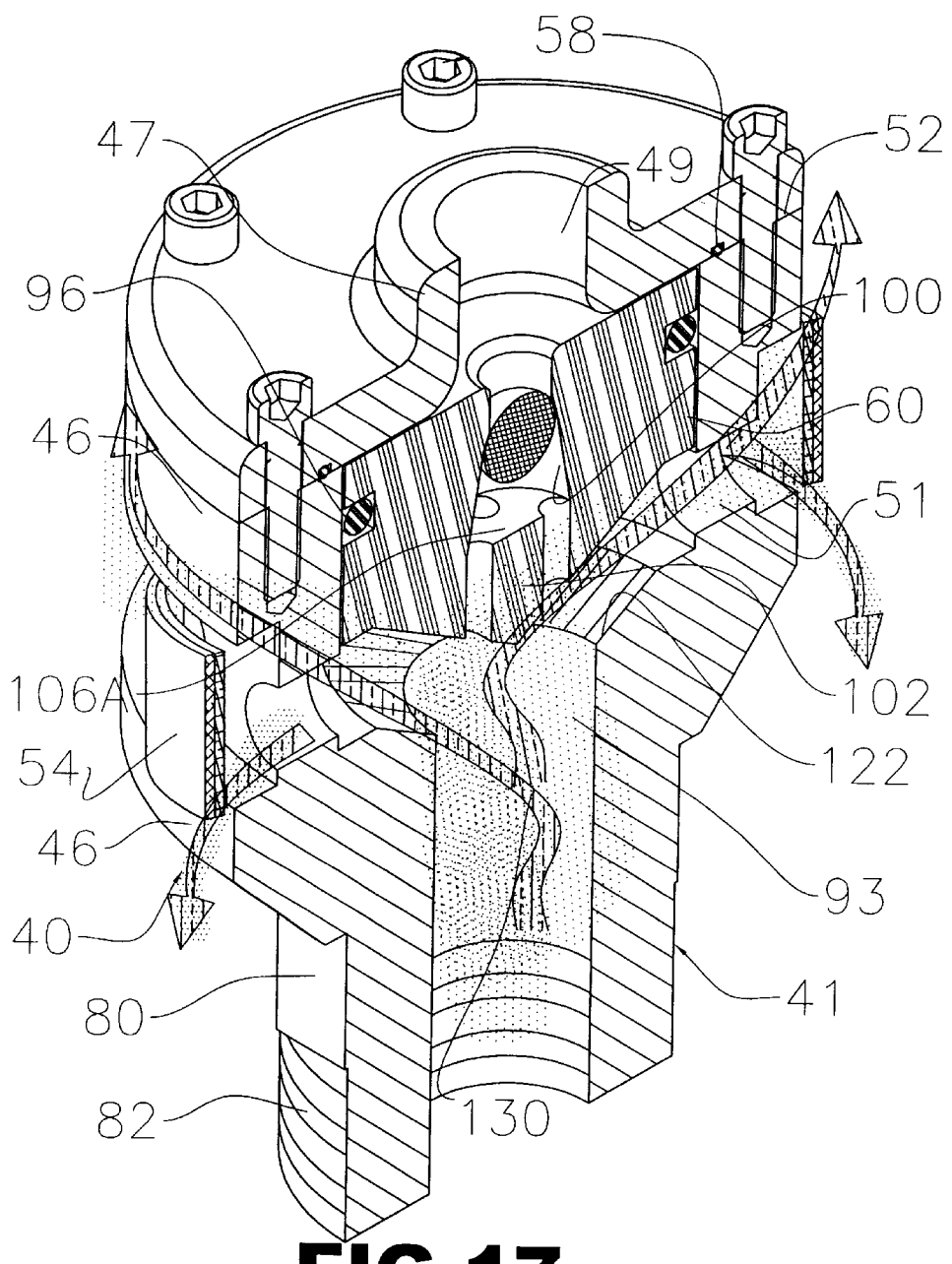
FIG. 17 is an enlarged, fragmentary, isometric view similar to FIG. 15, with the trigger in the aerator-discharge position, showing air discharge paths diagrammatically, and with portions shown in section for clarity; and, FIGS. 18–21 are sectional views of prior art devices.
Figure 18:
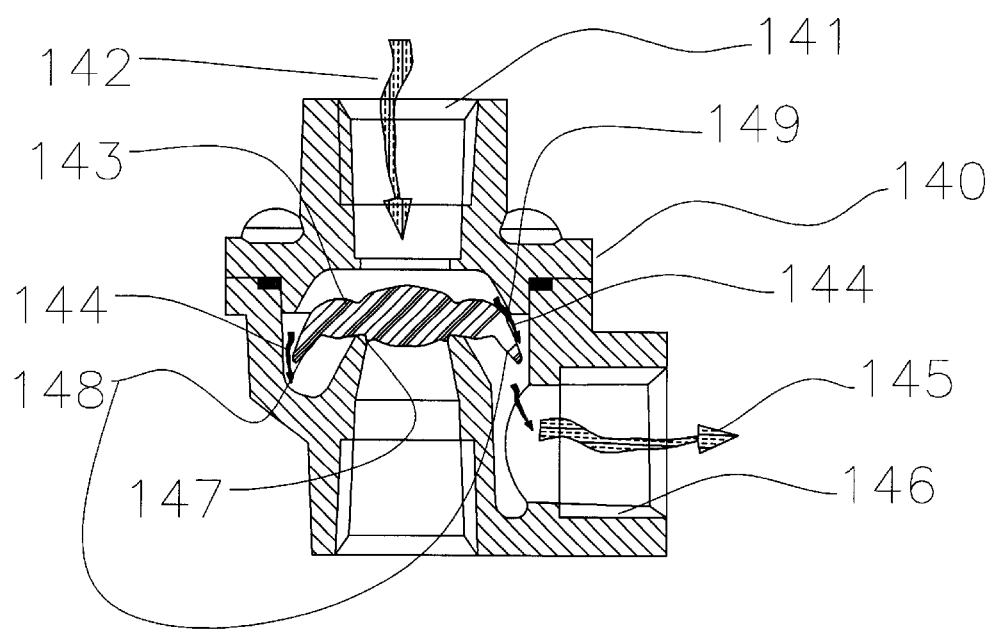
Figure 19:
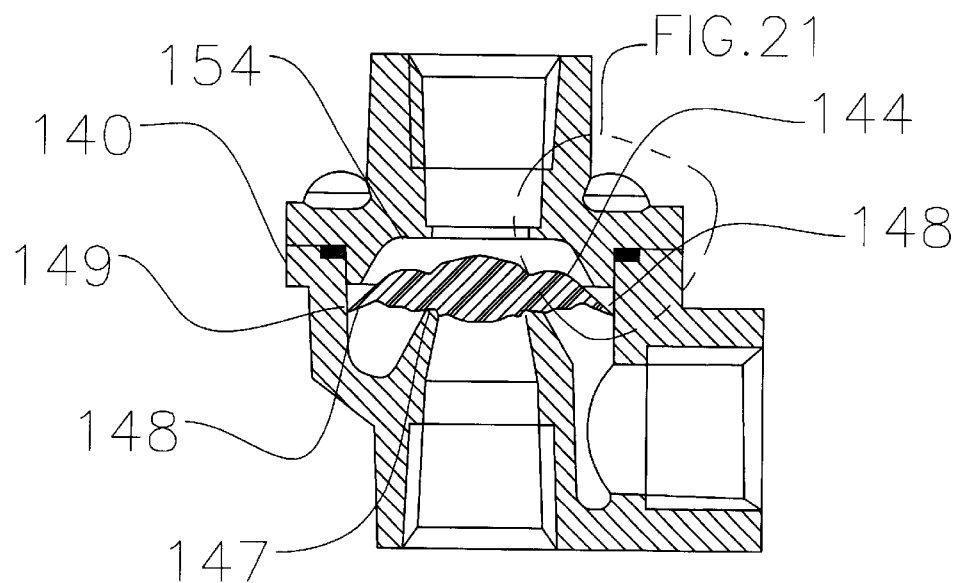
Figure 20:
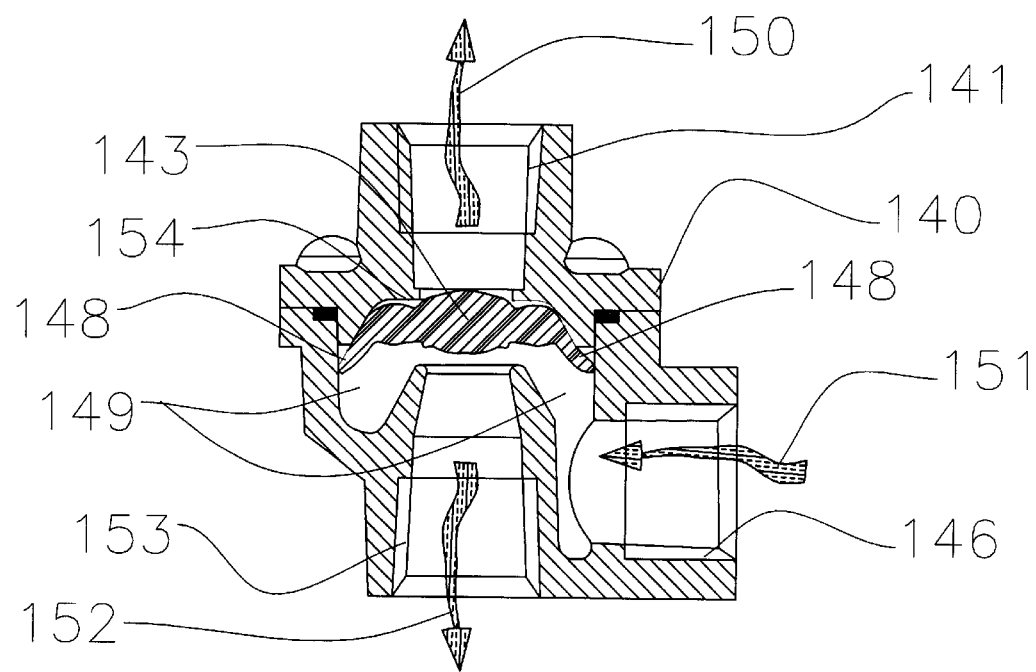
Figure 21:
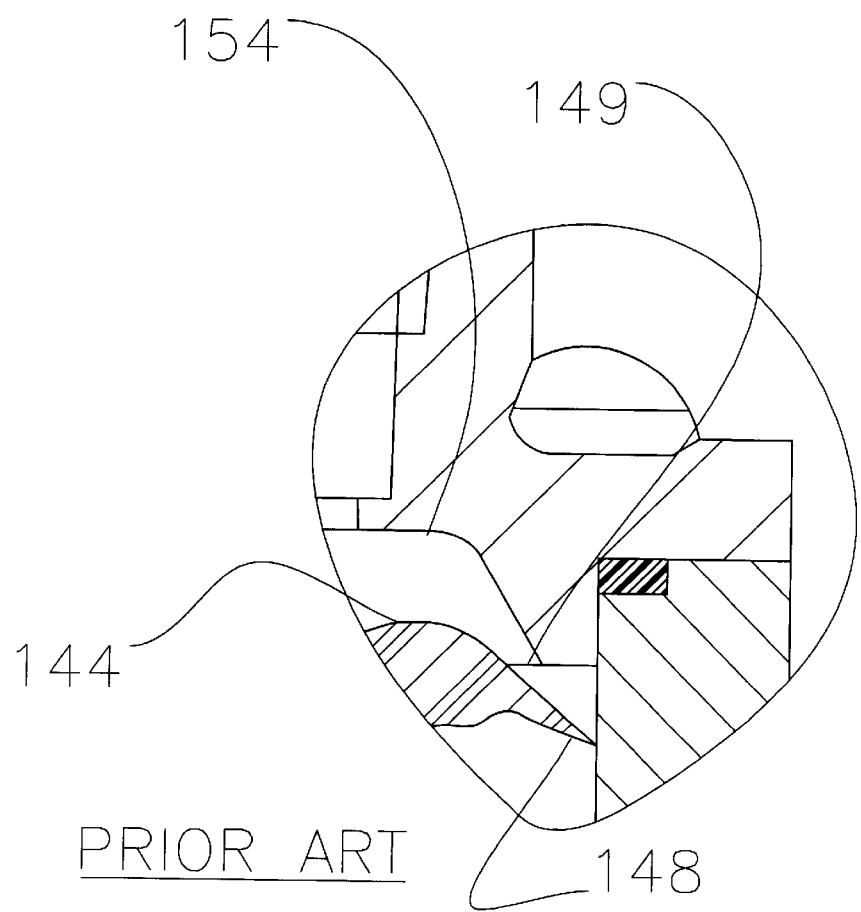

Referencing primarily FIGS. 4–7, the trigger piston 60 is slidably disposed within the housing interior 45 (FIG. 4) between cap 52 and body 46. The cylindrical interior 45 forms a "cylinder" in which piston 60 is dynamically disposed for reciprocal motion. Piston 60 is displaceable between the "fill" position of FIGS. 11, 12, nesting against and within passageway 44, and a retracted actuating position (i.e., FIGS. 16,17). In the fill position the piston conical bottom 92 (FIG. 8) bears against valve seat 122 (FIG. 12). When disposed in the actuating position, the piston top 63 (FIG. 5) is urged against the underside of cap 52 as seen in FIGS. 16, 17. Piston 60 comprises a generally cylindrical base 90 that is integral with a generally conical bottom 92. The flat top piston surface 63 seats against surface 52A of cover 52 when piston 60 is in its upper work cycle point. Conical piston bottom 92 seats against seat 122 within housing 40 when piston 60 is at its lowest point. A plurality of air vents 93 (FIG. 8) are defined in piston bottom 92, and these are in fluid flow communication with the interior piston passageway 98. As best seen in FIG. 10, the upper circumferential portion 104 is gently chamfered. A circumferential groove 94 defined in piston base 90 seats a resilient, deflectable O-ring 96 (FIG. 7). The elongated throughpassageway 98 includes a chamfered valve seat 98B (FIG. 8) that is coaxial with the center of the piston. Seat 98B forms a boundary with a lower, coaxial chamber 100 (FIG. 8) that gradually increases in diameter towards the bottom of the piston. The bottom surface boundary 106A (FIG. 8) of chamber 100 is radially surrounded by orifices 93 that vent the passageways. A resilient ball 102 forms a check-valve. Movement of the ball 102 is between surface 106A at the bottom of the chamber 100, and the upper seat 98B previously described.

Operation:

Referring now to FIGS. 12–17, air enters passageway 49 via the solenoid as indicated by arrow 120 (FIG. 12). This pushes piston 60 downwardly into contact with internal valve seat 122 (FIG. 12) defined within the housing 40 coaxially within body 46 below cylinder 45. At this time ball 102 is also displaced, and it is deflected downwardly (i.e., as viewed in FIGS. 12–16) out of contact with its seat 98B (FIGS. 8, 13) formed in the piston. Air now passes through the interior of piston 60, exiting vents 93 and entering the interior of the blast aerator to fill it, as indicated by arrows 129 (FIG. 6). The air blaster tank fills until the tank is at a sufficient line pressure and remains on standby until fired. The piston 60 stays sealed because of the piston O-rings and the seat-to-surface seals. Since the area exposed to air pressure is larger on the solenoid side than at the tank side, the piston is held firmly against the seat 122.

Figure 14:
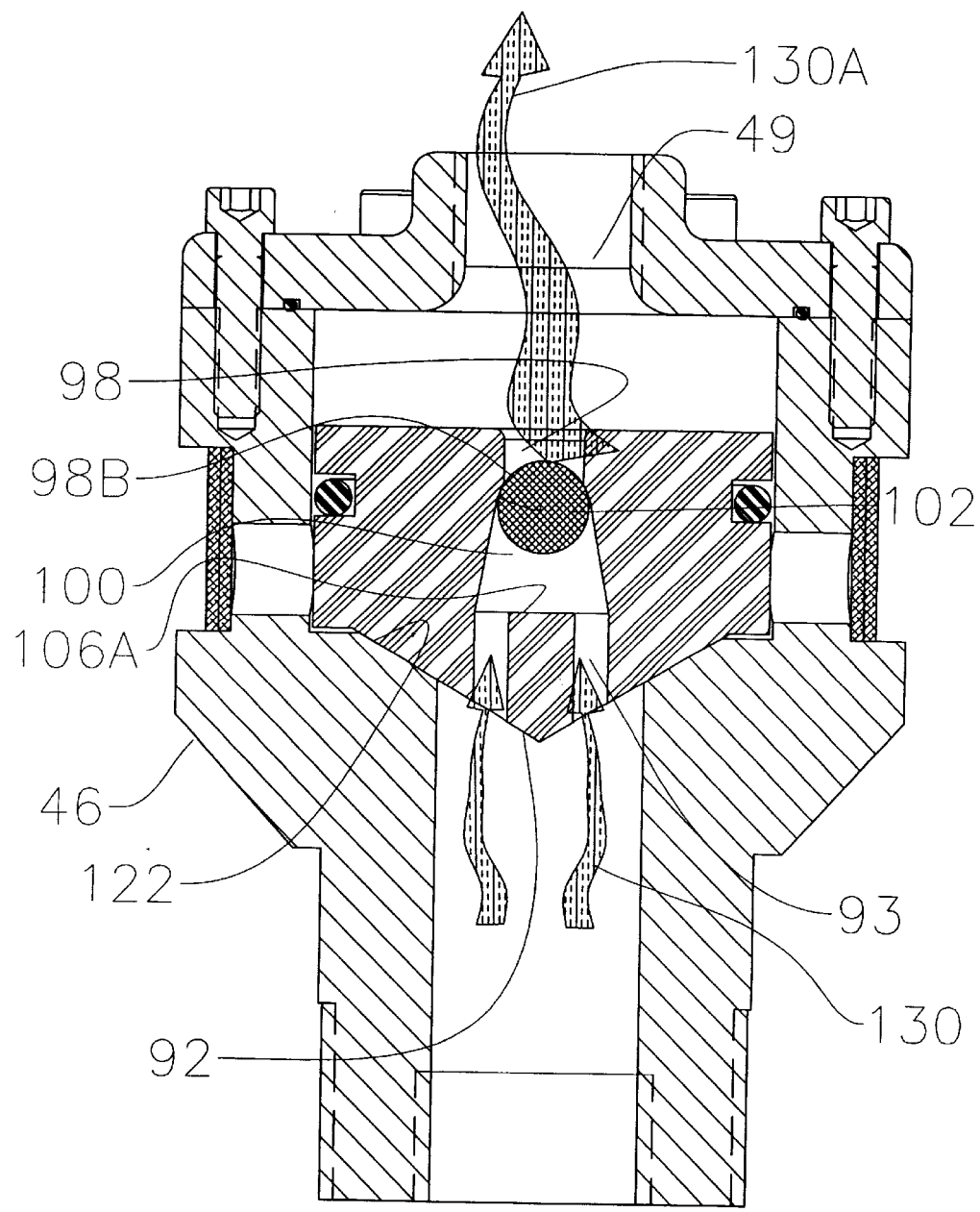
FIG. 14 is an enlarged, fragmentary, sectional view, with the trigger in the aerator-discharge position.
Figure 15:
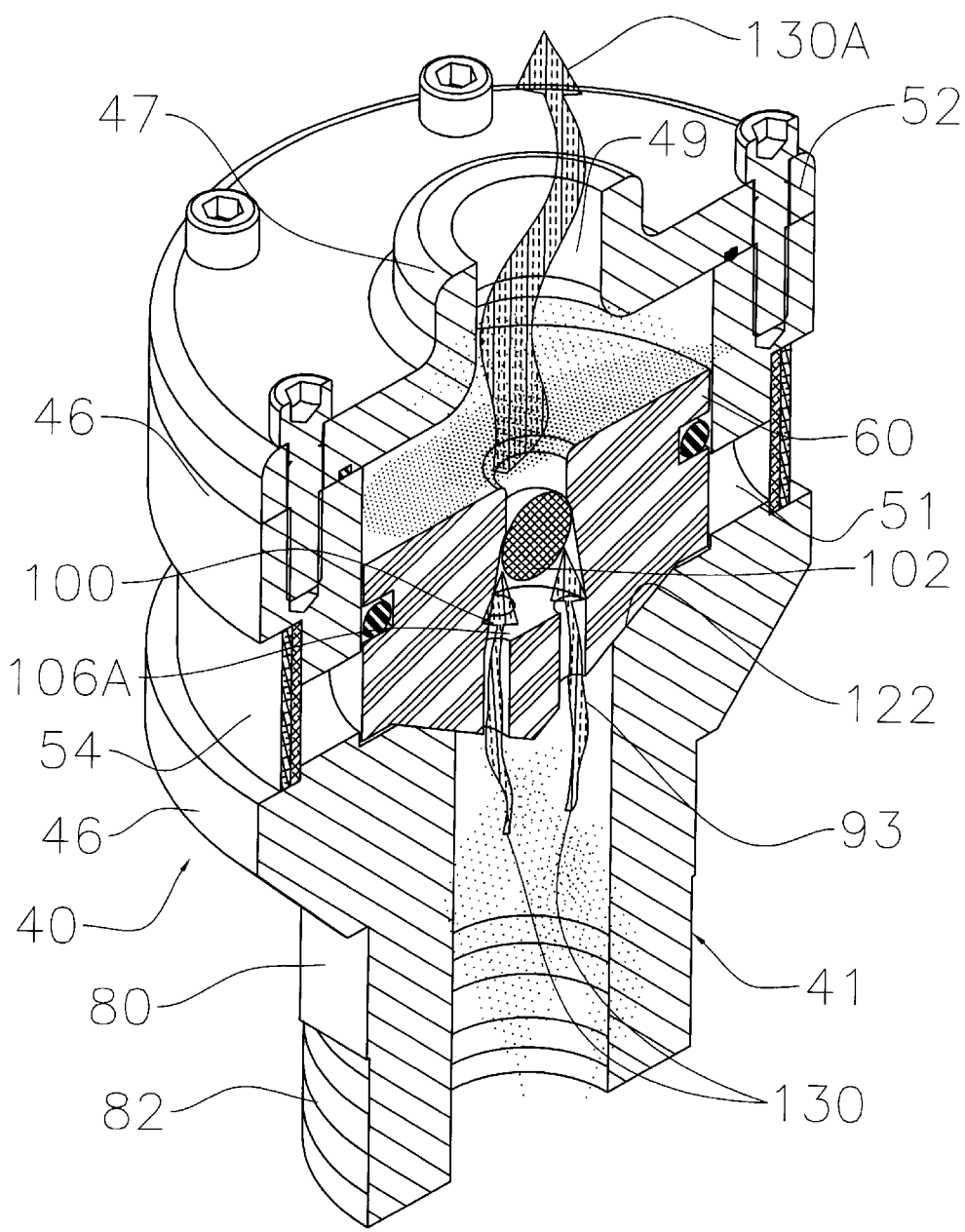
FIG. 15 is an enlarged, fragmentary, isometric view, with the trigger in the aerator-discharge position, showing air paths indicated diagrammatically, and with portions in section for clarity.

When the solenoid depressurizes passageway 49 (i.e., FIG. 12) at the piston rear, check ball 102 pops upwardly into contact with seat 98B (FIG. 14) and closes as in FIGS. 14, 16, and 17. Tank pressure now progressively blows the piston 60 back against housing cap 52 very quickly. As indicated by arrows 130 (FIGS. 14, 16) this backpressure is vented to atmosphere through radially spaced apart, housing orifices 51 (FIG. 16) as the resilient, surrounding band 54 expands. Now pipe passageway 65 (FIG. 3) is depressurized, and tube 36 (FIG. 1) activates the large blast aerator valve assembly 23 to detonate and fire the aerator. After detonation, the pressures equalize, and subsequent overpressure applied by the solenoid to passageway 49 again closes the piston for recharging. The cycle continues in the fashion, as governed by the electrical programming of the control solenoid.

Prior Art:

Referring to FIGS. 18–21, prior art devices are discussed. When air indicated by arrow 142 (FIG. 18) is introduced into a conventional inlet port 141, the diaphragm 143 is forced onto the exhaust seat 147. The outer lip 148 of the diaphragm 143 is deflected downward, away from the wall, allowing air 144 to flow into the tank with a minimum of restriction through passageway 149. The diaphragm 143 will remain in on the exhaust seat 147 as long as the inlet pressure is equal to or greater than the tank pressure. Air 145 fill out tank through outlet port 146. When the tank is fully charged (FIG. 20) and air is no longer flowing from inlet 141 to tank port 145, the outer lip 148 of the diaphragm 143 will assume its normal shape and will contact the outer wall. The diaphragm 143 wilt remain on the exhaust seat 147. When pressure indicated by arrow 150 (FIG. 20) at the inlet port 141 is vented to atmosphere (thru the control valve) the air in the pipe, which is at a pressure level higher than atmosphere, will force the diaphragm 143 upwards to the inlet port 141. This will shut off the inlet port 141 and allow air 152 in the pipe to flow directly to atmosphere.

Extreme wear and ear appears at the graduated ends 148 of the diaphragm 143. Flexure and deterioration in this region cases premature actuator and aerator failure. In my design, the full effects of the extremes of pressure buildup and discharge, and the concomitant displacement of the piston within the chamber cylinder, is moderated over time by the combined action of the captivated check valve ball within the piston, and the radial sideways path of the piston discharge vents. In effect, trapped air within the piston forms a pneumatic cushion that eliminates the requirement of separate mechanical springs.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A blast aerator comprising:
   an air tank adapted to be mounted upon or adjacent a storage bin, hopper or other bulk material container;
   a high volume actuator valve assembly connected to said tank to exhaust same upon command;
   air inlet means adapted to be alternately connected between high pressure air for filling the tank and low pressure venting for firing the aerator;
   quick exhaust valve means for firing said aerator by commanding said high volume actuator valve assembly, said quick exhaust valve means coupled to said air inlet means and comprising:
      a rigid, generally cylindrical housing adapted to be coupled to the air tank, the housing having a hollow interior in fluid flow communication with said air inlet means and said high volume actuator valve assembly;
      a plurality of vent orifices radially disposed about the periphery of said housing;
      a resilient band surrounding the housing and covering the vent orifices to form a one-way check valve that lets air escape from the housing but prevents air from entering the housing;
      a resilient piston coaxially, slidably disposed within said hollow interior of said housing, the piston comprising a top, a bottom, a hollow internal chamber, an air passageway extending from said top through said chamber towards said bottom, and a first valve seat coaxial with said air passageway;
      a second valve seat defined within the hollow interior of said housing contacted by said piston to close the housing interior when the aerator is to be filled;
      a plurality of piston air vents defined in the piston bottom in fluid flow communication with the piston air passageway; and,
      a valve element captivated within said piston chamber that is displaceable from a loose position within the chamber to a sealed position seating against said first valve seat;
   whereby air directed into the quick exhaust valve means from the air inlet means pushes the piston into contact with the second valve seat and frees the valve element from contact with the first seat allowing air to pass through the piston to fill the aerator, and,
   whereby, when the housing is depressurized the piston valve element contacts said first valve seat and resulting rising pressure deflects the piston, exposing the radially spaced-apart vent orifices allowing pressure to escape by deflecting the resilient band to fire the a high volume actuator valve assembly.

2. The blast aerator as defined in claim 1 wherein the hollow interior piston chamber increases in diameter between the first valve seat and the piston bottom.

3. The blast aerator as defined in claim 2 wherein the valve element is spherical.

4. The blast aerator as defined in claim 2 wherein the a high volume actuator valve assembly is connected to said quick exhaust valve means through a pipe extending interiorly through said aerator tank.

5. A quick exhaust valve for controlling devices such as blast aerators, air accumulators, air cannons, or other applications that periodically output large charges of air or gas, said quick exhaust valve assembly comprising:

means for receiving air and vacuum from adjacent air inlet means a rigid, generally cylindrical housing in fluid flow communication with said means for receiving air and vacuum, a plurality of vent orifices radially disposed about the periphery of said housing;

a resilient band surrounding the housing and covering the vent orifices to form a one-way check valve that lets air escape from the housing but prevents air from entering the housing;

a resilient piston coaxially, slidably disposed within said hollow interior of said housing, the piston comprising a top, a bottom, a hollow internal chamber, an air passageway extending from said top through said chamber towards said bottom, and a first valve seat coaxial with said air passageway;

a second valve seat defined within the hollow interior of said housing contacted by said piston to close the housing interior;

a plurality of piston air vents defined in the piston bottom in fluid flow communication with the piston air passageway; and, a valve element captivated within said piston chamber that is displaceable from a loose position within the chamber to a sealed position seating against said first valve seat;

whereby air directed into the quick exhaust valve means from the air inlet means pushes the piston into contact with the second valve seat and frees the valve element from contact with the first seat allowing air to pass through the piston to fill the application, and, whereby, when the housing is depressurized the piston valve element contacts said first valve seat and resulting rising pressure deflects the piston, exposing the radially spaced-apart vent orifices allowing pressure to escape by deflecting the resilient band to fire the application.

6. The quick exhaust valve as defined in claim 5 wherein the hollow interior piston chamber increases in diameter between the first valve seat and the piston bottom.

7. The quick exhaust valve as defined in claim 6 wherein the piston valve element is spherical.

\* \* \* \* \*